United States Patent [19]

Ficarelli

[11] Patent Number: 5,474,136
[45] Date of Patent: Dec. 12, 1995

[54] SYSTEM FOR THE FAST ROAD TRANSPORTATION OF CUMBERSOME INDUSTRIAL OR AGRICULTURAL EQUIPMENT

[76] Inventor: Ivano Ficarelli, 8, via G. Leopardi, Bagnolo in Piano (Reggio Emilia), Italy

[21] Appl. No.: 233,954

[22] Filed: Apr. 28, 1994

[30] Foreign Application Priority Data

Apr. 29, 1993 [IT] Italy .................................. RE93A0040

[51] Int. Cl.$^6$ ........................................................ E01H 5/04
[52] U.S. Cl. ............................................ 172/272; 172/274
[58] Field of Search .................................. 56/14.9; 111/57, 111/164, 194, 925, 926; 172/311, 484, 625, 310, 383, 47, 776, 272, 125, 134, 240, 244, 248

[56] References Cited

U.S. PATENT DOCUMENTS

| | | | |
|---|---|---|---|
| 2,897,904 | 8/1959 | Schwegler | 172/274 X |
| 4,688,819 | 8/1987 | Reilly et al. | 172/272 X |
| 4,884,639 | 12/1989 | Nozaka et al. | 172/272 X |
| 4,887,680 | 12/1989 | Nozaka et al. | 172/292 X |
| 5,029,650 | 7/1991 | Smit | 172/272 X |
| 5,111,603 | 5/1992 | Knowlton et al. | 172/272 X |

*Primary Examiner*—Dennis L. Taylor
*Assistant Examiner*—Robert Pezzuto
*Attorney, Agent, or Firm*—Oblon, Spivak, McClelland, Maier & Neustadt

[57] ABSTRACT

A system for the fast road transportation of a cumbersome equipment comprises a first plate coupled with a lifting unit and connected by a hydraulic jack to the equipment. Against this plate a second plate is coupled which is provided with two parallel, horizontal and elongated curved slots cooperating with four fixed pins, three of them being placed at the apices of a horizontal base triangle, the fourth being located in the middle of the horizontal base of the triangle. The slots extend as anti-clockwise curved slots, the upper one directed downward, the lower one directed upward and having radiuses equal to the distance of the fourth pin respectively from the apex pin and from the base pin. A further anti-clockwise curved slot is provided directed downward which starts from the lower slot at a distance from its end equal to the double of the distance from the fourth pin to the base pin.

3 Claims, 3 Drawing Sheets

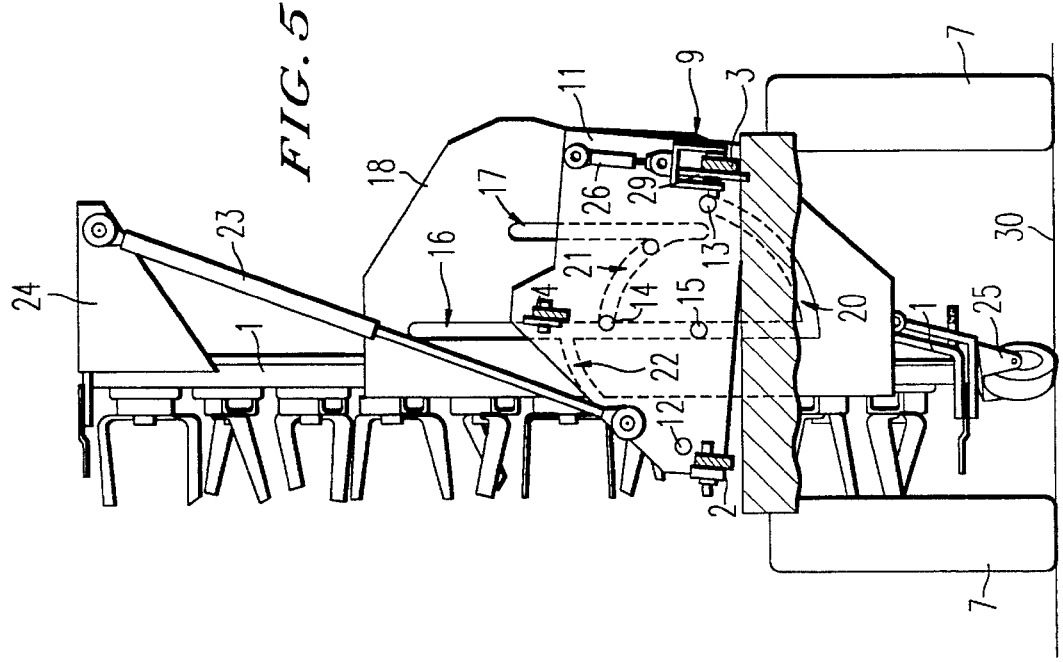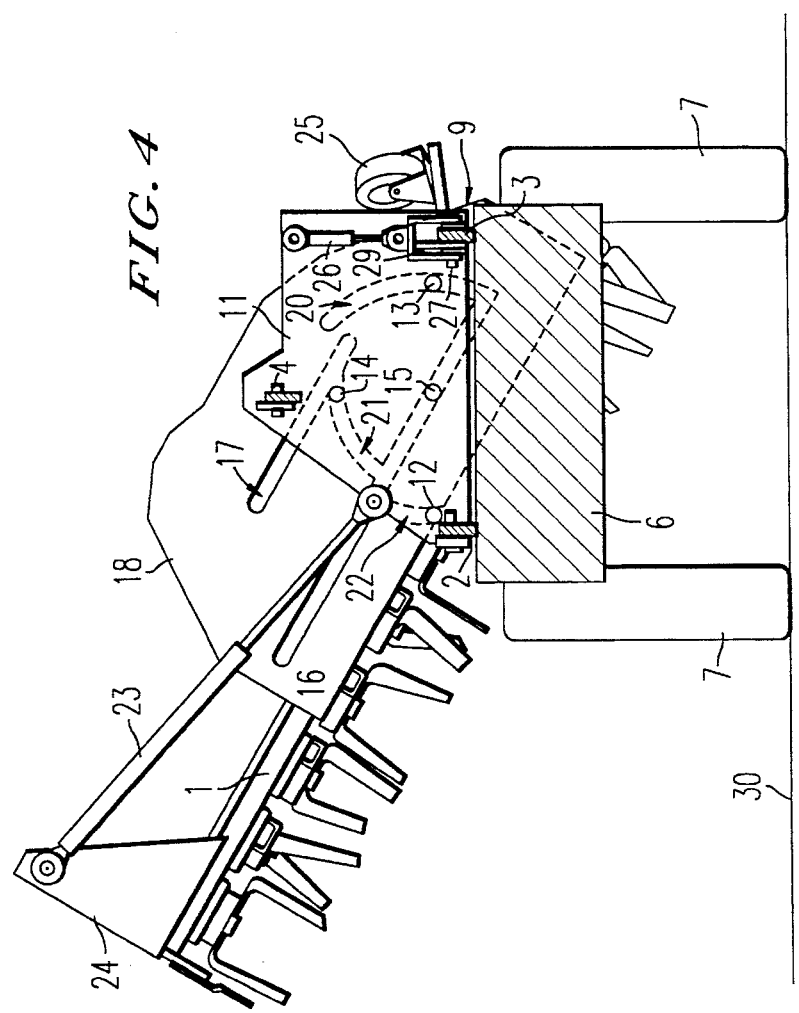

5,474,136

SYSTEM FOR THE FAST ROAD TRANSPORTATION OF CUMBERSOME INDUSTRIAL OR AGRICULTURAL EQUIPMENT

BACKGROUND OF THE INVENTION

1. Field of the Invention

The present invention relates to an economical and efficient system that, by allowing a smooth, simple and fast shift into a vertical position, driven by a towing means, of a cumbersome industrial or agricultural equipment, it makes possible the road transportation of said equipment.

2. Discussion of the Background

It is well known that some industrial, mainly agricultural, equipment such as harrows, tedders, sowing machines, cutters, pathway makers, fertilizer distributors a.s.o. shows an overall width that very much exceeds 2.50 meters, maximum value permissible for the road circulation.

Therefore there is a problem for its road transportation, which is more and more important with the coming into force of new road traffic regulations.

The above problem is currently solved by disconnecting the equipment from the towing means, and connecting said towing means with a special trailer suitable to carry the equipment, placed on it with its higher dimension parallel to the movement direction. The uneasiness of such a solution is readily apparent, which, apart from requiring a considerable waste of time for the operations of the equipment disconnecting, the rising and positioning on the trailer as well as the reverse operations, once the operating zone is reached, requires also the availability of a cumbersome and expensive special trailer.

SUMMARY OF THE INVENTION

It is an object of the present invention to avoid the above-mentioned drawbacks and to provide for an efficient system which allows the reduction of the size of the equipment to permissible proportions, without disconnecting it from the towing means.

The above object is substantially reached by rotating the equipment through 90 degrees around a fixed pin, coupled with the towing means, up to a complete vertical position thereof, after having rised and sideway moved it, to make possible such rotation without any ground interference.

More particularly, the above rotation is mechanically obtained by means of three pins placed on a first fixed plate, coupled with the towing means, and located substantially at the apices of a triangle having an horizontal base, and by means of a fourth pin placed in the middle of the horizontal base of the above triangle.

The above fixed pins cooperate with two parallel and horizontal elongated slots provided on a second plate coupled with the equipment and placed against the first plate. The above two slots subsequently extend to two anti-clockwise curved slots, the upper one directed downward, the lower one directed upward, said curved slots having a radius equal to the distance of the above fourth pin respectively from the apex fixed pin and the base fixed pin. A further corresponding anti-clockwise curved slot, directed downward, is provided, having the radius equal to the distance of said fourth fixed pin from one of the above base. Such further curved slot starts from the above lower curved slot at a distance, from its elongated portion, equal to the double of the distance of the above fourth fixed pin from one of the two base fixed pins.

In such a way, a movement of the second plate with respect to the fixed first plate, obtained by means of a hydraulic jack hinged between said first fixed plate and a projected tailpiece of the equipment, will firstly compel the second plate, and as a consequence the entire equipment, to move sidewise until the horizontal slot ends are blocked by the corresponding fixed pins of the first fixed plate. Thereafter, said movement, being the pins located at the apices of the triangle, just in correspondence of said curved slots, will compel said pins to follow the patterns of the above curved slots. It results, therefore, being the pins fixed, a substantial rotation of the second plate, and consequently of the equipment, around said fourth fixed pin acting as a fulcrum.

On the other hand, since the above rotation does not the equipment, lead to an exact verticality of additional means are provided to compensate the rotation as well as supporting means for the upright equipment.

As a matter of fact, the system according to the present invention for the fast road transportation of a cumbersome industrial or agricultural equipment connected to the lifting unit of a towing means, is characterized in that it comprises a first fixed plate connected by hinging to the brackets of the towing means a lifting unit. Such plate has three pins located substantially at the apices of a horizontal base triangle, as well as a fourth pin located in the middle of the horizontal base of said triangle, said fixed pins cooperating with two slots parallelly and horizontally elongated and provided on a second plate placed against the first plate and coupled with said equipment, such slots subsequently extending to two anti-clockwise curved slots, the upper one directed downward, the lower one directed upward, having radius equal to the distance of said fourth fixed pin respectively from the apex fixed pin and the base fixed pin. A further corresponding anti-clockwise curved slot is provided which is directed downward and having a radius equal to the distance of said fourth fixed pin from one of the two base fixed pins, said further slot starts from the above horizontal slot at a distance, from its elongated end, equal to the double of the above distance of said fourth fixed pin from one of two base pins. Said first plate is hinged to one end of a driving hydraulic jack, whose second end is hinged to a projecting tailpiece of said equipment, further means being provided to additionally compensate the verticalization as well as to support the weight of said upright equipment.

According to a preferred embodiment of the present invention, said means for the additional compensation of the verticalization of said equipment comprises a second hydraulic jack vertically hinged between said first plate and one of the hinges connecting said plate to the brackets of the lifting unit of the towing means, the hinging pin of said hinge passing through a vertical elongated hole provided on a bracket coupled to said first plate.

Therefore by employing said second hydraulic jack it is possible to lower said first plate on the jack side of an extent equal to the length of said hole that results in a rotation of the entire system, and particularly the equipment, which may correct in such a way its verticalization.

Finally according to another preferred embodiment of the present invention, said means for supporting the weight of said upright equipment comprises in a holding and moving wheel that, turnably hinged to the lower end of the upright equipment, can be blocked in its position.

In such a way, by lowering the upright equipment of the towing means, by means of the lifting unit of the towing mean, until said supporting wheel, once turned and blocked in its position, reaches the ground, the remarkable overall weight is supported, during the transportation, by said wheel only, with the exclusion of the lifting unit of the towing means.

The invention will be better explained with reference to the annexed drawings illustrating a preferred specific embodiment of the invention provided as an example only, but not to be intended as limiting the scope of the invention in that, technical and structural changes can be made without departing from the scope of the invention. For instance, instead of employing hydraulic jacks, use can be made of mechanical or electrical means to move said second plate and therefore the equipment; the necessary side displacement of the equipment, indispensable to allow the vertical rotation, can be made also on the right side of the towing means in addition to the left side; furthermore, instead of a harrow, the equipment may be a tedder, a sowing machine, a fertilizer distributor or any other agricultural or industrial equipment exceeding the permissible width.

BRIEF DESCRIPTION OF THE DRAWINGS

FIGS. 2 to 5 show front, partial sectional, views on a smaller scale of the operating phases of the fast transportation system of FIG. 1.

DESCRIPTION OF THE PREFERRED EMBODIMENTS

Figure 1:
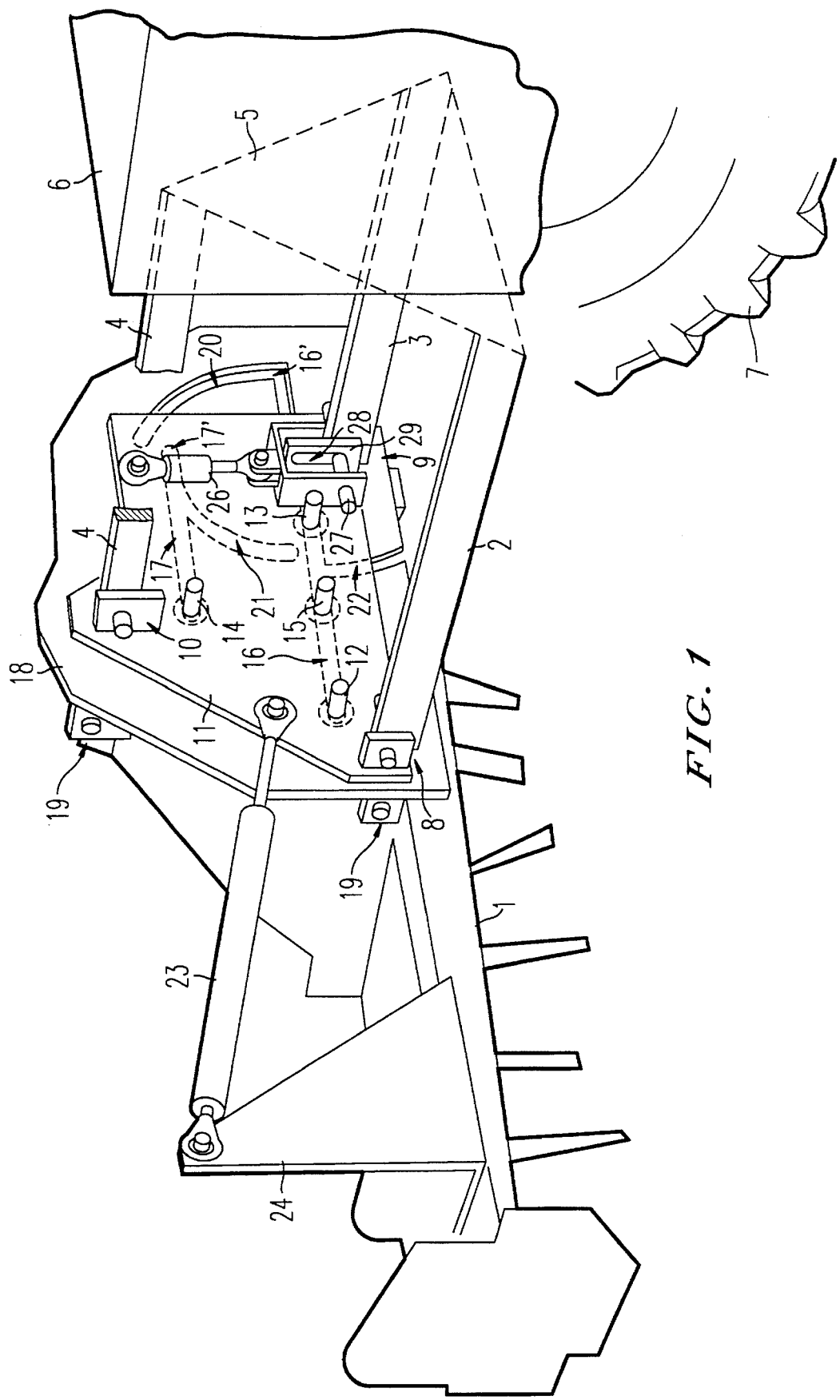
FIG. 1 shows a partial perspective and partial sectional view of a harrow connected to the lifting unit of a towing means by means of the fast transportation system according to the invention.

In the figures, 1 indicates the cumbersome equipment, consisting of a harrows to be connected, using the fast transportation system of the invention, to three brackets 2,3, and 4 of a lifting unit, schematically represented in FIG. 1, of a towing means 6, also schematically represented in FIG. 1, equipped with transportation wheels 7.

For the above purpose, a first plate 11, having three horizontal pins 12, 13 and 14 substantially placed at the apices of a horizontal base triangle (see specifically FIG. 2) as well as a fourth horizontal pin 15 situated in the middle of the horizontal base of said triangle (see FIG. 2), is coupled with the above three brackets 2,3 and 4 by means of the hinges 8,9 and 10. The above horizontal pins 14 and 12, 15 and 13 slip into two parallel and horizontally elongated slots, respectively 16 and 17, provided on a second plate 18, placed against the plate 11 and coupled with the equipment 1 by means of hinges 19 (see FIG. 1).

Said lower slot 16 of the plate 18 forms then, at its right end, an anti-clockwise curved slot 20 directed upward having a radius equal to the distance of said fourth pin 15 from the base fixed pin 13. The above upper slot 17 forms an anti-clockwise curved slot 21 directed downward having a radius equal to the distance of said fourth pin 15 from the apex pin 14; a further anti-clockwise curved slot 22, directed downward and having the radius equal to the distance of said fourth pin 15 from the apex pin 12, is provided on the fixed plate 18 starting from said lower slot 16 at a distance, from its elongated end 16', equal to the double of the distance of said fourth pin 15 from the base pins 12 or 13. On the other hand said first plate 11 is also connected with the equipment 1 through a driving hydraulic jack 23, hinged between said plate 11 and a projecting tailpiece 24 of said equipment 1. At the other end of the equipment a support and transportation wheel 25 is provided, which is turnably hinged to said end of the equipment and can be blocked in its position.

Finally a second hydraulic jack 26 is vertically hinged between said first plate 11 and the hinge 9, whose hinging pin passes through an elongated, vertical hole 28 (see FIG. 1) of a bracket 29 coupled with said first plate 11.

The operations are now evident.

Figure 2:
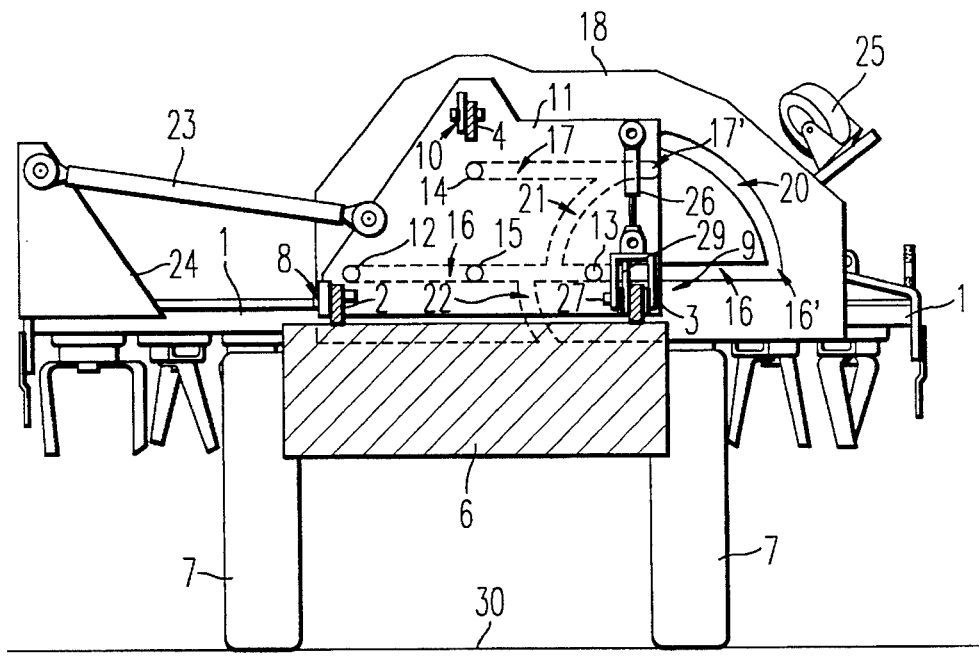
Figure 3:
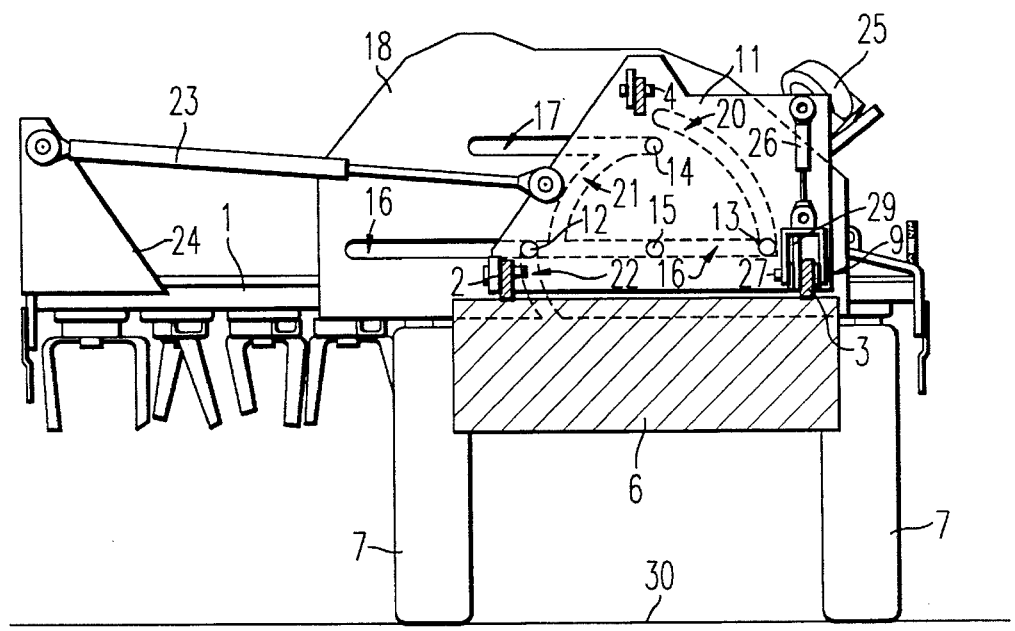

Once the equipment 1 is risen by the lifting unit 5, as shown in FIG. 2, the hydraulic jack 23 is started, so that it displaces to the left the equipment 1 and consequently said second plate 18, until the elongated ends 16' and 17', of the horizontal slots 16 and 17, reach the fixed pins, respectively 13 and 14, as it is illustrated in FIG. 3. At this moment the three fixed pins 12, 13 and 14 are just in correspondence of the relevant curved slots 22, 20 and 21 and the equipment can be rotated without any risk of interference with the ground. In fact by continuing the action of said jack 23, the cooperation between said pins and the corresponding slots makes said second plate 11, and consequently the equipment 1, anti-clockwise rotate around the fulcrum constituted by the fixed pin 15 (see FIG. 4), until said pins reach the limit stop of their respective slots. At this moment, by starting and retracting the second hydraulic jack 26, a lowering of the equipment is obtained, on the side of the jack, to an extent equal to the length of such hole 28, resulting in a further clockwise rotation of the equipment 1 which may be, in such a way, perfectly verticalized. Finally, once the wheel 25 has been turned and blocked in its position and then lowered by means of the lifting unit 5 until said wheel 25 reaches the ground 30, the equipment, supported by said wheel, is ready to be transported on the road.

I claim:

1. A system for transporting industrial or agricultural equipment which is connected to a lifting unit of a towing means on roads, the system comprising:

a first fixed plate connected by hinges to brackets of a towing means lifting unit, said first fixed plate having three pins which include two base pins and an apex pin and are located substantially at apices of a horizontal base triangle, and a fourth pin located at a middle of a horizontal base of the horizontal base triangle, said pins cooperating with two parallel slots which are horizontally elongated and provided on a second plate which is placed against the first plate and coupled with said equipment;

wherein:

an upper slot of said two slots extends to a downwardly directed anti-clockwise curved slot and has a radius substantially equal to a distance between said fourth pin and said apex pin;

a lower slot of said two slots extends to an upwardly directed anti-clockwise curved slot and has a radius substantially equal to a distance between said fourth pin and one of said base pins;

a further corresponding downwardly directed anti-clockwise curved slot extends from the lower slot and has a radius substantially equal to a distance between said fourth pin and one of said base pins, said further downwardly directed slot starting from the lower slot at a distance from an elongated end of the lower slot which is substantially equal to double the distance between the fourth pin and one of said base pins;

the first plate is hinged to a first end of a driving first hydraulic jack, a second end of the driving first hydraulic jack being hinged to a projecting tailpipe of the equipment; and said system further comprises means for additionally compensating a verticalization of the equipment and means for supporting a weight of the equipment in a upright position.

2. A system according to claim 1, wherein said means for additionally compensating a verticalization of the equipment comprises a second hydraulic jack vertically hinged between said first plate and one of the hinges which connect said first plate to the brackets of the-lifting unit of the towing means, a hinging pin of said one hinge passing through a vertical elongated hole provided on a further bracket coupled to said first plate.

3. A system according to claim 1, wherein said means for supporting the weight of said upright equipment comprises a holding and moving wheel that is turnably hinged to a lower end of the equipment in an upright position and can be blocked in said position.

* * * * *